(12) United States Patent
Grinde et al.

(10) Patent No.: US 6,935,650 B2
(45) Date of Patent: Aug. 30, 2005

(54) TRAILER HITCH

(75) Inventors: James E. Grinde, Farmington, MN (US); Karl L. Hacken, Apple Valley, MN (US); James J. Jordan, Apple Valley, MN (US)

(73) Assignee: Curt Manufacturing, Inc., Eau Claire, WI (US)

( * ) Notice: Subject to any disclaimer, the term of this patent is extended or adjusted under 35 U.S.C. 154(b) by 0 days.

(21) Appl. No.: 11/006,246

(22) Filed: Dec. 6, 2004

(65) Prior Publication Data

US 2005/0098980 A1    May 12, 2005

Related U.S. Application Data

(62) Division of application No. 10/353,515, filed on Jan. 29, 2003, now Pat. No. 6,846,000.

(51) Int. Cl.⁷ .............................. B60D 1/44; B60D 1/50
(52) U.S. Cl. ....................................... 280/435; 280/439
(58) Field of Search ................................ 280/433, 435, 280/436, 439; 403/79

(56) References Cited

U.S. PATENT DOCUMENTS

| | | | |
|---|---|---|---|
| 974,877 A | 11/1910 | Greene | |
| 2,102,821 A | * 12/1937 | Seyferth | ............ 280/434 |
| 2,212,708 A | 8/1940 | Fraser | |
| 2,215,903 A | 9/1940 | Edwards | |
| 2,541,209 A | 2/1951 | Cox | |
| 2,618,486 A | 11/1952 | Durant | |
| 2,788,989 A | 4/1957 | Davies | |
| 2,794,656 A | 6/1957 | Seyferth | |
| 2,910,306 A | 10/1959 | Georgi | |
| 3,122,382 A | 2/1964 | Carrier | |
| 3,392,992 A | * 7/1968 | Baker et al. | ............ 280/423.1 |
| 3,528,683 A | 9/1970 | Janeway | |
| 3,869,147 A | 3/1975 | Fry | |
| 4,227,713 A | 10/1980 | Blodgett, Jr. et al. | |
| 4,721,323 A | 1/1988 | Czuk et al. | |
| 5,060,964 A | 10/1991 | Vick | |
| 5,356,167 A | 10/1994 | Hall et al. | |
| 5,509,682 A | 4/1996 | Lindenman et al. | |
| 5,516,138 A | * 5/1996 | Fontaine | ............ 280/434 |
| 5,529,329 A | 6/1996 | McCoy | |
| 6,170,850 B1 | 1/2001 | Works | |
| 6,276,244 B1 | 8/2001 | Fisher et al. | |
| 6,485,045 B1 | 11/2002 | King | |

FOREIGN PATENT DOCUMENTS

EP        0 114 046 A2    1/1984

* cited by examiner

*Primary Examiner*—Kevin Hurley
(74) *Attorney, Agent, or Firm*—Shewchuk IP Services, LLC; Jeffrey D. Shewchuk

(57) ABSTRACT

An improved fifth wheel hitch for attaching a trailer to a towing vehicle. The hitch includes an outer box support frame having two rails for mounting the trailer hitch to the towing vehicle, a spherical bearing mounted in the frame having a ball joint, and a latch assembly affixed to the spherical bearing to allow the assembly to have two degrees of movement, and a head body. The latch assembly comprises a base plate, a jaw fixed at a first elevation, and a vertically displaceable jaw. A means are provided to raise the vertically displaceable jaw above the level of the fixed jaw to allow release of the king pin latch. When the jaws are coplanar they capture the kingpin of a trailer, and safely lock the trailer to the hitch.

20 Claims, 6 Drawing Sheets

TRAILER HITCH

CROSS-REFERENCE TO RELATED APPLICATION(S)

The present application is a divisional of application Ser. No. 10/353,515, filed Jan. 29, 2003 and entitled TRAILER HITCH, now issued as U.S. Pat. No. 6,846,000, incorporated by reference herein.

BACKGROUND OF THE INVENTION

I. Field of the Invention.

The present invention relates generally to the trailer hitch and, more particularly, to an improved fifth wheel hitch designed to better accommodate pulling forces and secure the kingpin on the tongue of a trailer to be towed by a vehicle.

II. Description of the Prior Art.

People who live and work in urban and suburban areas often find themselves with the desire to "want to get away from it all." They drive to secluded areas, where they can just relax. Others, desiring a more mobile lifestyle, have turned a trailer into their home. The question is, how to get their boats, campers, trailers, and the like from their busy lives to different locations.

Pick-up trucks are often used to tow trailers. This creates a need for a towing hitch which can be affixed to the bed of a pick-up truck and both accommodate the pulling forces to which the trailer is exposed when traversing uneven terrains, and provide a latching mechanism which is both easy to operate as well as safe and reliable. Further, the hitch should be removable so that the truck bed can be freed of obstruction.

To deal with the problem of traveling over uneven terrain with a trailer attached to a towing vehicle, it is recognized that the hitch head should be allowed to tilt fore and aft, as well as side-to-side pivoting. The prior art has numerous examples of mechanisms to allow such tilting, most by a gimble arrangement. Allowing this movement reduces the strain placed on the latching mechanism of the hitch. Such movement however can create its own wear-and-tear on the tilting mechanism itself, creating additional repair and replacement costs. A need is therefore identified for a fifth wheel hitch assembly for coupling a trailer to a towing pick-up truck which allows for two degrees of movement of the head assembly, while at the same time reducing the friction caused by such movement.

In addition to allowing the head assembly to tilt, the hitch assembly must effectively hold the kingpin of the trailer. When the towing vehicle comes to a stop, the trailer will continue to move forward, until it is interfered with by the trailer hitch. When the kingpin moves forward and is not completely surrounded by the latching mechanism, it will create a jolt along with a loud and disturbing sound. Moreover, the kingpin will wear on the unsupported area of the latching mechanism.

Finally, the entire hitch assembly must not only be easily removable from the towing vehicle, but also must be easily adjustable on the truck bed of the towing vehicle. Fifth wheel hitches are typically bolted to the bed of the towing vehicle above its rear axle. However, when the trailer must be maneuvered in tight spaces, it is useful to be able to adjust fore/aft the location of the hitch assembly to a position nearer to the pickup's tailgate.

OBJECTS

It would be advantageous to provide a fifth wheel hitch which overcomes the known problems of the prior art hitches. It is an object of the present invention to provide a fifth wheel hitch, mountable on the bed of a towing vehicle, such as a pick-up truck.

It is a further object of the present invention to provide a trailer hitch which, while bolted to the bed of the towing vehicle, can be adjusted and positioned in a longitudinal direction along a pair of rails.

It is another object of the present invention to provide a trailer hitch which securely holds the trailer's kingpin within the hitch assembly.

It is still another object of the present invention to provide a trailer hitch which can permit the vehicle being towed to adjust to the terrain on which the towing vehicle travels.

SUMMARY OF THE INVENTION

These objects are accomplished by the present invention which comprises, in its preferred embodiment, a support frame having two horizontal support legs for mounting the trailer hitch to the towing vehicle, a spherical bearing mounted in the frame creating a ball joint, a latch assembly affixed to the spherical bearing to allow the latch assembly to have two degrees of movement, and a head body to aid in guiding a kingpin into the latch assembly. The latch assembly comprises a base plate with two pivot pins extending upwardly, two pivotable jaws attached to the pivot pins, and a stationary release cam. One of the jaws is fixed at one elevation. The second jaw, can be vertically displaced so that it is either above the fixed jaw, or coplanar with the fixed jaw. A lever with a cam follower is used to elevate the vertically displaceable jaw. When a kingpin of a trailer is inserted into the head body, it is captured by the two jaws, and then locked into place. When the towing vehicle turns, or travels on uneven roads, the trailer adjusts accordingly as the base plate is attached to the spherical bearing.

It is an advantage of the present invention that the latching assembly is movable along two degrees of movement namely, fore and aft and side-to-side or in pitch and yaw. These and other advantages, objects and features of the present invention will become apparent from the drawings, detailed description and claims which follow.

DETAILED DESCRIPTION OF THE INVENTION

Figure 1:
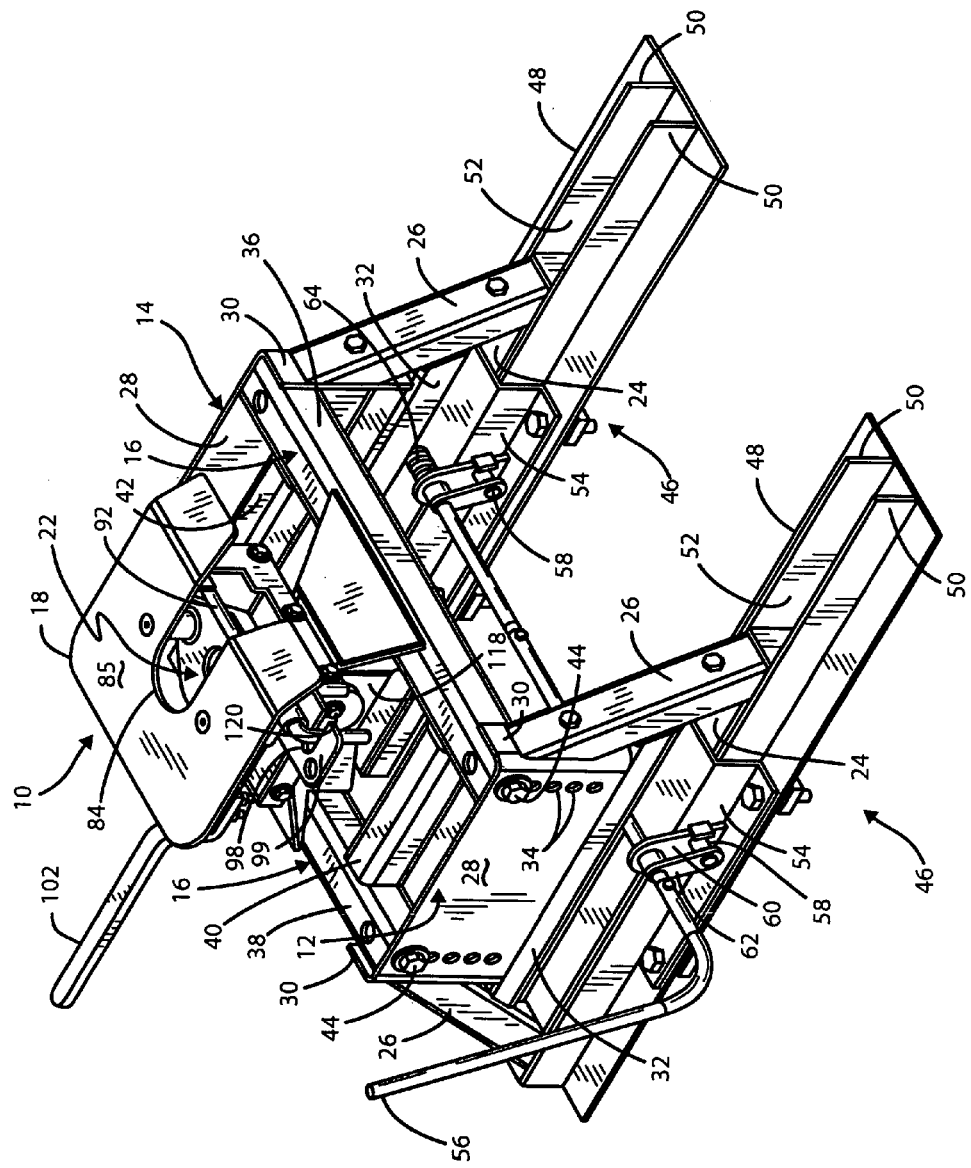
FIG. 1 is a side perspective view from above of a preferred embodiment of the present invention.

The present invention provides a fifth wheel trailer hitch. The invention is useable in a variety of towing vehicles. The invention is described in the context of a towing hitch for a 5$^{th}$ wheel trailer as a specific example for illustrative purposes only. The appended claims are not intended to be limited to any specific example or embodiment in the following description. It will be understood by those skilled in the art that the present invention may be used in conjunction with a variety of towing devices, including, but not limited to, fifth wheel hitches. Further, in the drawings described below, the reference numerals are generally repeated where identical elements appear in more than one figure.

Figure 2:
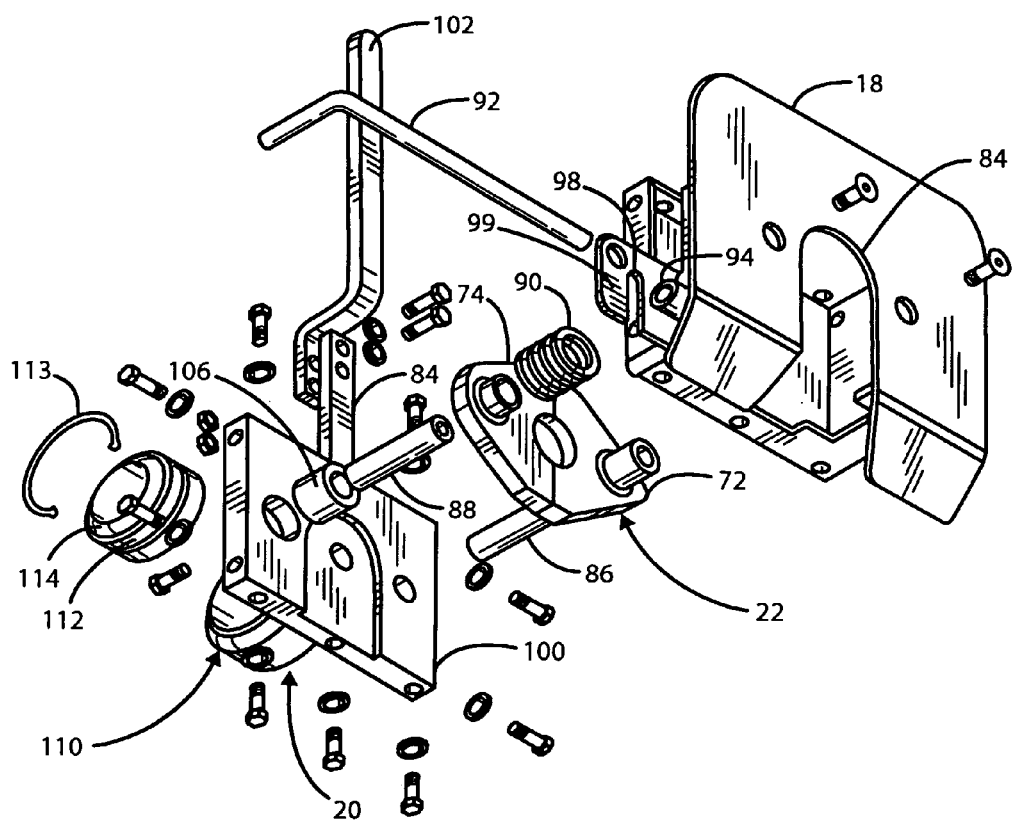
FIG. 2 is an exploded view of the base plate, the latching assembly and the head body of the trailer hitch of the present invention.

Referring to the drawings, FIG. 1 shows the preferred embodiment of a trailer hitch 10 for use in flat bed and pick-up trucks when towing a 5th wheel trailer. The trailer hitch has two side frame assemblies 12 and 14, a top frame assembly 16 which joins the two side frame assemblies 12 and 14 in a parallel spaced relationship, a head body 18, and a base assembly 20 (FIG. 2). Within the head body 18 there is a latching assembly 22 which is shown in detail in the exploded view of FIG. 2.

In FIG. 1, the side frame assemblies 12 and 14 each have a horizontal support leg 24 which supports two braces 26. A mounting bracket 28 of a predetermined width having a pair of side members 30 is supported by a support leg 32 extending between the pair of braces 26 for the mounting bracket 28 and the end portions of the horizontal support leg 24. The mounting brackets 28 each have a pattern of apertures 34 formed therethrough. The apertures 34 are adapted to receive a fastener for connecting the side frame assemblies 12 and 14 to the top frame assembly 16.

The top frame assembly 16 has a front horizontal bar 36 and a rear horizontal bar 38 held in spaced relation by two spaced-apart cross bars 40 and 42. Fasteners, as at 44, are inserted into the apertures 34 of the U-shaped mounting bracket 28 and are received by the front and rear horizontal bars 36 and 38. The pattern of apertures 34 in the mounting bracket 28 is adapted to allow selection of an elevation of the top frame assembly 16 above the horizontal support legs 24. The head body 18 is mounted on the top frame assembly 16.

In the preferred embodiment illustrated in FIG. 1, the side frame assemblies 12 and 14 are mounted to the truck bed by a rail-latch assembly indicated generally by numeral 46. Two guide rails 48 are adapted to be bolted to the upwardly facing surface of the bed of a towing vehicle and extend longitudinally in parallel spaced relation. The guide rails 48 each have two vertical sidewalls 50 (FIG. 1) extending perpendicularly from a base to form a guide channel 52. The horizontal support leg 24 of the side frame assembly 12 and 14 ride on the base of the guide rails 48 and are straddled by the two sidewalls 50. The horizontal support legs 24 of the side frame assemblies 12 and 14 are capable of sliding within the channels 52, allowing the hitch assembly to be placed over the towing vehicle's rear axle when traveling over-the-road or at a position nearer to the tailgate when backing and maneuvering in tight quarters.

U-shaped clamps 54 bolted to the truck bed hold the horizontal support legs 24 of the side frame assemblies 12 and 14 down and function as a travel limiter. To fix the side frame assemblies 12 and 14 at a particular position along the rails 48 a locking structure shown in FIG. 1 is used. The locking structure comprises a lever 56, a latch pin 58, and bracket 60.

The lever 56 is attached to the latching pin 58 by a link 62. The lever 56 passes through an aperture in the bracket 60. A coil spring 64 runs along the lever between the backside of the bracket 60 and a bolt (not shown) attached to the end of the lever 56 to urge the latch pin 58 to the right when viewed in FIG. 1. To disengage the locking structure and allow the hitch assembly to be longitudinally positioned, the user pulls the lever 56 to the left which, in turn, removes the latching pin 58 attached to the lever 56 from aligned holes in bracket 60, U-shaped bracket 54 and rails 50. The user then rotates the lever and the latching pin 58. The coil spring 64 pulls the lever 56 and latching pin 58 against the bracket 54. The rail latch assembly 46 is now able to slide to a particular maneuvering position. When the outer support frame is located at a particular position, the lock can be re-engaged. The user turns the lever 56 so that the latching pins 58 line up with a receiving hole on the bracket 54 and with a hole that is aligned with a like opening in the U-Shaped clamp bracket 54, the sidewall 50, and the horizontal support leg 24 of the side frame assemblies 12 and 14. A tube runs transversely through the center of the horizontal support leg 24 and surrounds the latch pin 58 when the locking structure is engaged.

Figure 3:
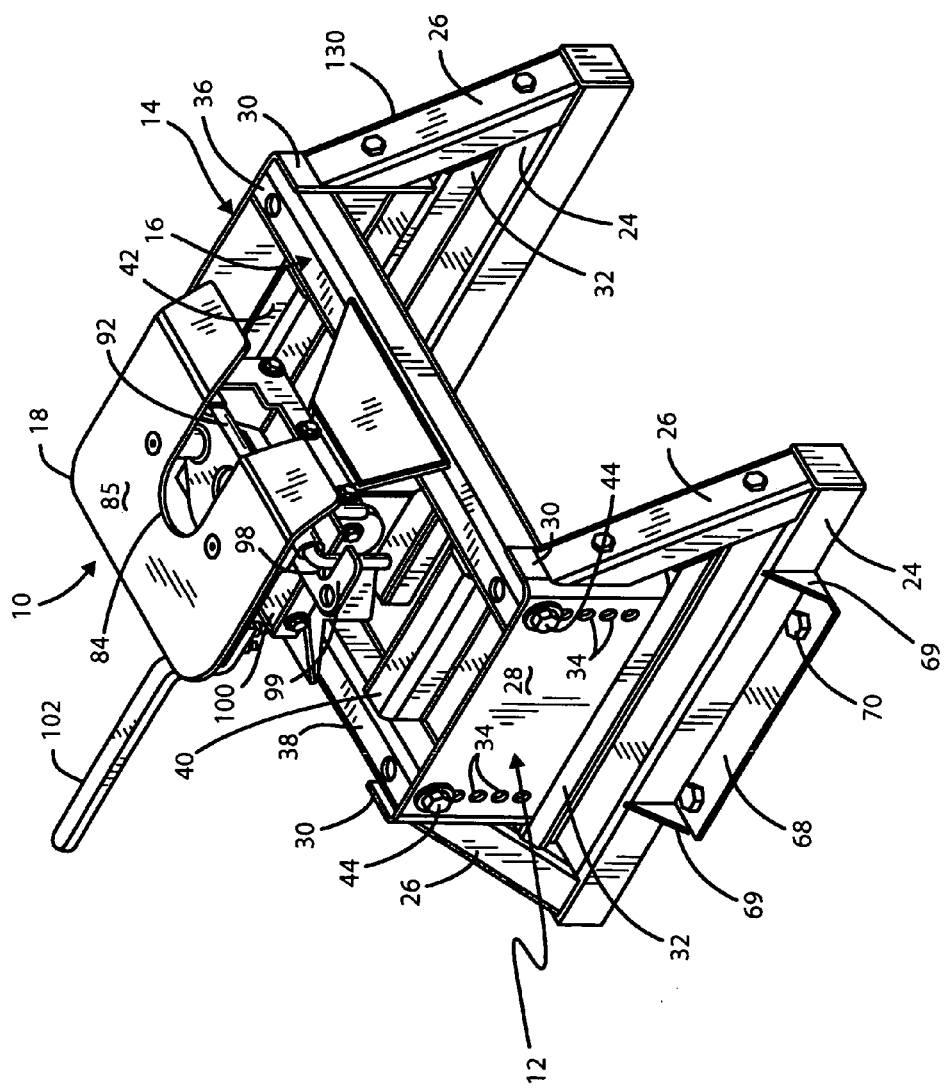
FIG. 3 is a side perspective view of an alternative embodiment of the invention having a fixed mount.

In an alternative embodiment shown in FIG. 3, the side frame assemblies 12 and 14 are mounted at a fixed location on the towing truck bed. A flange plate 68 with side gussets 69 is welded to the outside surface of the horizontal support leg 24. The flange plates 68 on each side have bolt receiving apertures for securing the side frame assembly to the bed of the towing vehicle by means of bolts, as at 70.

Once the entire hitch unit is attached to the towing-vehicle it is ready to receive the kingpin of a trailer. The kingpin latching assembly 22 of the present invention is shown in the exploded view of FIG. 2 and In a perspective subassembly view of FIG. 4 and comprises a pair of cooperating jaws 72 and 74 that must be placed in the open position shown in FIG. 4 to receive and capture the kingpin. Here, one somewhat U-shaped jaw 72 is mounted to pivot at a fixed elevation on the base plate 20. A second, vertically displaceable U-shaped jaw 74 rests on the top surface of the fixed-elevation jaw 72. Since both jaws are U-shaped, when the latch is open, due to a semicircular recess formed inwardly of mated edges 76 and 78, the back leg 80 of the vertically displaceable jaw 74 is resting at an angle so that there is a gap between the front legs 82 of the two jaws. The towing vehicle can now be backed toward the trailer until the kingpin on the trailer passes into the U-shaped cut-out 84 in the top plate 85 of the head body 18. As the trailer's kingpin then passes through the gap between the front edges 76 and 78 of the jaws and presses against the back legs of both jaws, the jaws pivot on the axis of the pivot pins 86 and 88. When the edges of the vertically displaceable jaw 74 and the jaw 72 that is fixed in elevation becomes aligned, a return spring 90 forces the vertically displaceable jaw 74 downward so that the front edge surfaces 76 and 78 of the jaws 72 and 74 are both collinear and coplanar. The kingpin is then trapped in the circular aperture created by the two semicircular recesses formed in the front, edge 76 and 78 of the jaws 72 and 74. The cooperation between the front edges 76 and 78 of the two jaws prevent the jaws from opening up and releasing the kingpin.

As a safety measure, to prevent the vertically displaceable jaw 74 from lifting clear of the fixed jaw 72 is during travel, a safety pin 92 shown in FIGS. 1–3 is inserted into an aperture 94 on the side wall of the head body 18 and is threaded through a second aperture (not shown) which is aligned with the first aperture 94. The safety pin 92, when inserted into the aperture formed in the head body 18, rests on the top of the two jaws 72 and 74, and interferes with upward displacement of the vertically displaceable jaws 74. The safety pin 92 is bent at a right angle at one end, and the bent tip portion 96 can be inserted into a notch 98 in an ear 99 extending from the sidewall of the head body 18 to prevent it from vibrating loose during travel.

Figure 4:
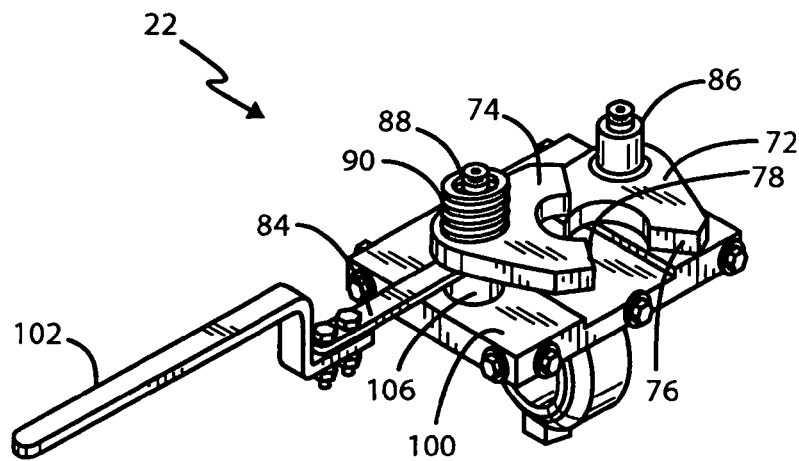
FIG. 4 is a perspective view of the head body removed to more clearly show the base plate assembly and the latching assembly.

The entire latching assembly is mounted on a base plate 100 (FIG. 4). To detach the kingpin from the latching assembly, one merely needs to first remove the safety pin 92 from the head body 18, and then turn a release handle 102. The release handle 102 is attached to a hand lever 104 of a cam follower 106. The cam follower 106 has a bore formed through it for receiving the pivot pin 88 therethrough. Formed into the base plate 100 is a cam surface 108. As the cam follower 106 is rotated, the cam follower raises and falls as defined by the profile of the cam. The bottom of the vertically displaceable jaw 74 rests on the top of the cam follower 106. When the cam follower 106 is raised, it pushes up on the vertically displaceable jaw 74 against the force of the return spring 90, and the bottom surface of the vertically displaceable jaw 74 then slides onto the top surface of the fixed jaw 72. The force of the kingpin acting on the front edges of the jaws 72 and 74 causes a gap there between to open, allowing the kingpin to move free of latching mechanism of the hitch unit.

While the preferred embodiment discloses a cam and a cam follower arrangement for elevating the jaw 74 above the is jaw 72, those skilled in the art will appreciate that equivalent mechanical devices, such as sliding wedge or a lever mechanism can also be used.

Figure 5:
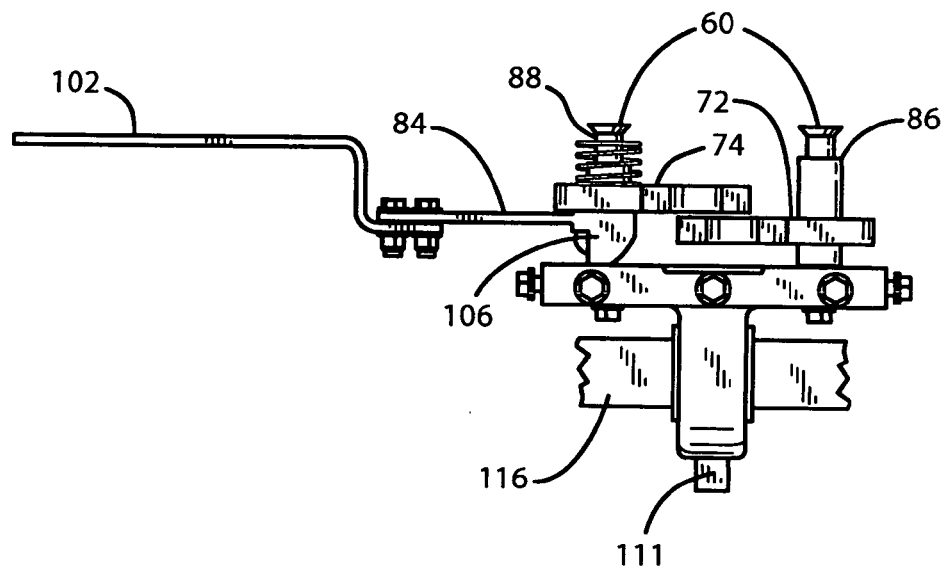
FIG. 5 is a side view of the base plate and latch assembly in its released position.
Figure 6:
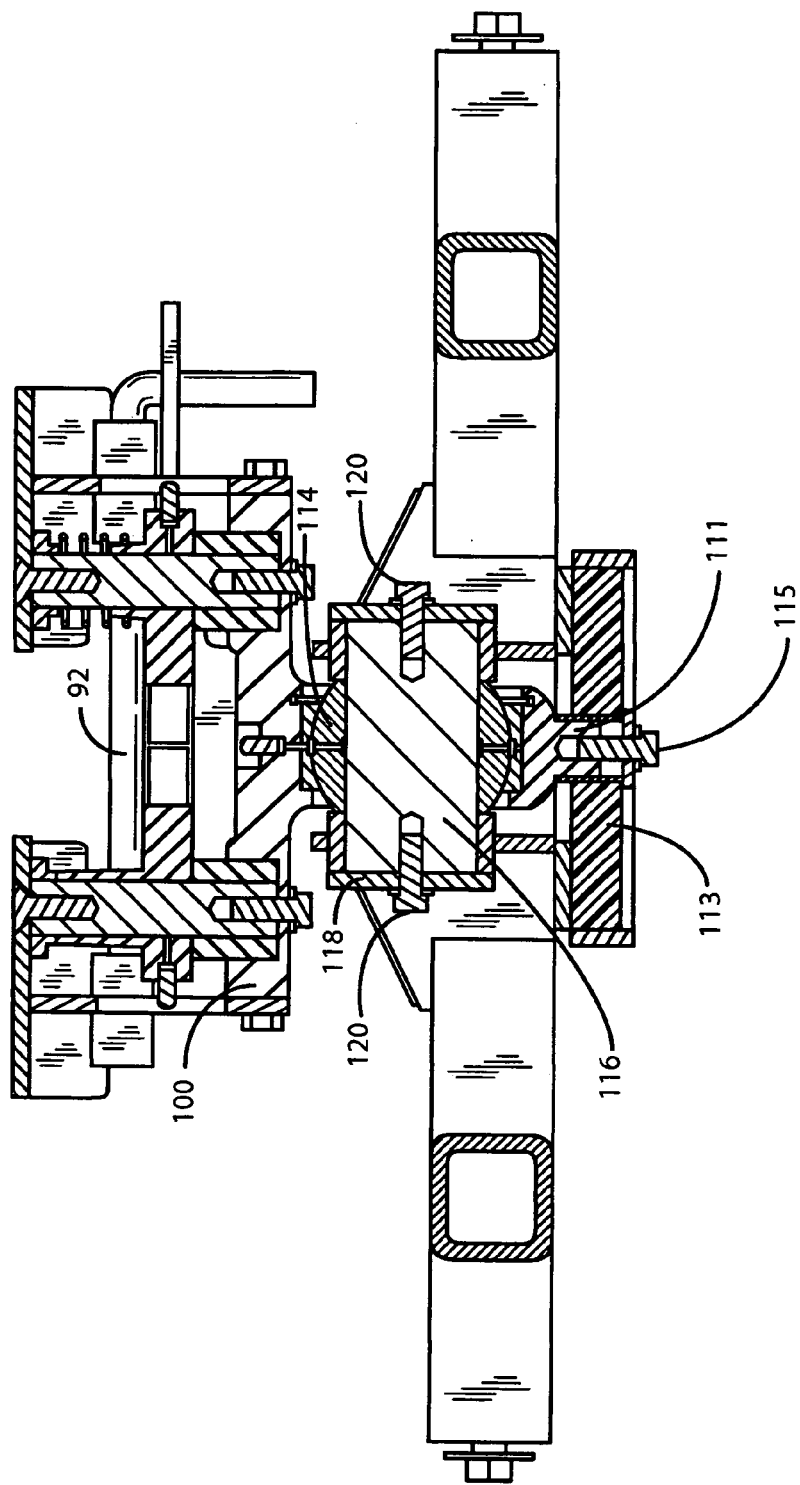
FIG. 6 is a cross-sectional view of the preferred embodiment showing the base plate having a center pin passing thought a spherical bearing having a vertically disposed race.

As seen in FIG. 2, in the preferred embodiment, a spherical bearing housing 110 allows the base plate 100 to accommodate towing forces to which it is exposed when traversing uneven terrain. A spherical bearing race 112 is secured in the bottom of the base plate 100. A spherical bearing 114 is captive in the race 112 and held in place by a snap ring 113. In this embodiment, the spherical race 112 is vertically disposed. A cylindrical center pin 116 (FIGS. 5 and 6) passes through a diametric bore formed through the spherical bearing 114. The cylindrical center pin 116 is attached at opposed ends thereof to opposed, parallel assembly walls 118 of the head body by a pair of fasteners 120. The base assembly with its spherical bearings 114 allows two degrees of freedom of movement, and provides a limit to the extent that the base plate 100 can tilt from side to side.

A nub 111 is integrally attached to the bottom of the bearing housing 110. A urethane filled cartridge 113 is affixed to the top of the nub 111. The nub 111 has a threaded hole 115 which receives a bolt 115 for affixing the urethane filled cartridge 113 to the nub 111. The urethane is of a compliance to absorb the shock created when the kingpin is received by the latch jaws 72 and 74.

Figure 7:
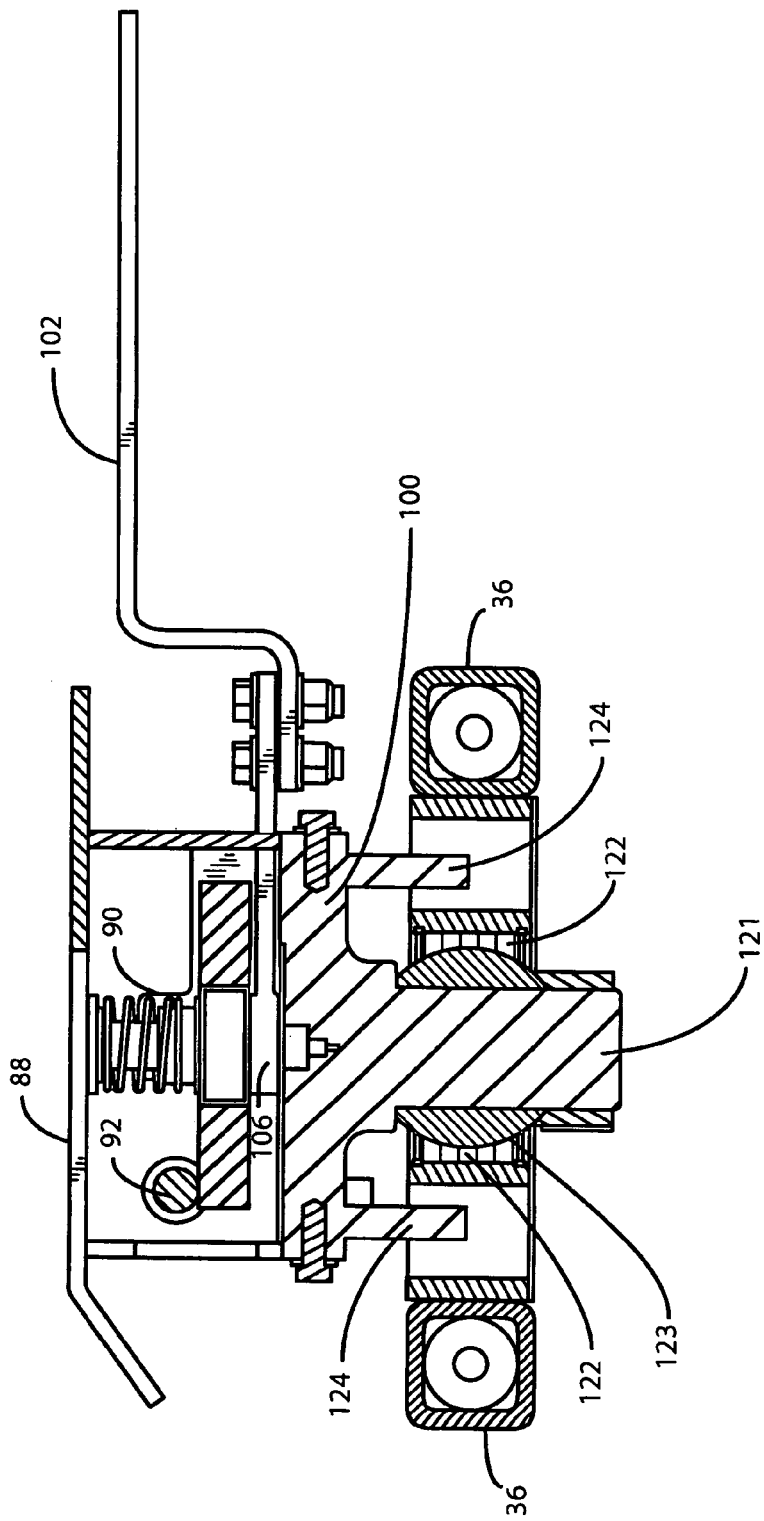
FIG. 7 is a cross-sectional view of an alternative embodiment showing the base plate having a center pin passing through a spherical bearing having a horizontally disposed race.

In an alternative embodiment shown in FIG. 7 a vertical center pin 121 extends downward from the midpoint of the underside of the base plate 100. The spherical race 122 is horizontally disposed. The vertical center pin 121 passes through a diametric bore formed through the spherical bearing 123.

The use of the spherical bearing assembly allows the base plate 100 to accommodate towing forces to which it is exposed when traversing uneven terrain or when, for example, one wheel of the trailer is made to ride over a speed bump, or curb, or the like. Two restraint devices 124 extend vertically downward from the underside of the base plate 100. The restraint devices 124 are disposed proximate the front and rear edges of the base plate 100. When the head body 18 is attached to a trailer kingpin and the trailer is turned, a rotating moment is developed about vertical pin 121. Restraint device 124 limits the extent of rotation to the size of the apertures through which they protrude.

Various alterations and modifications to the present invention will, no doubt, occur to those skilled in the towing art. It is the following claims, including all equivalents, which define the scope of the present invention.

What is claimed is:

1. A trailer hitch for engaging a kingpin of a trailer, comprising:
    a support frame; and
    a latch assembly supported on the support frame, the latch assembly for receiving the kingpin of a trailer, wherein the latch assembly comprises:
        a) two pivot pins extending generally vertically;
        b) first and second jaws individually hinged for rotation in a generally horizontal plane about the pivot pins, the first jaw being rotatable about its associated pivot pin at a fixed elevation, the second jaw being both rotatable and vertically displaceable about its associated pivot pin; and
        c) a means for elevating the second jaw above a level of the first jaw.

2. The trailer hitch as in claim 1 wherein the first and second jaws each comprise a flat plate, each having at least one cooperative edge, the edge including a generally semicircular recess midway along a length dimension of the at least one cooperative edge and configured such that when the at least one cooperative edge on the first jaw is abutting the cooperative edge on the second jaw, a circular opening is formed whose diameter is generally equal to a diameter of the kingpin.

3. The trailer hitch as in claim 2 wherein the pivot pins are positioned such that at least one cooperative edge of the first jaw operatively engages the at least one cooperative edge of the second jaw to prevent rotation of the first and second jaws about their respective pivot pins when the first and second jaws are coplanar.

4. The trailer hitch as in claim 2 wherein the cooperative edge is straight.

5. The trailer hitch as in claim 3 wherein the first and second jaws are free to rotate about their respective pivot pins when the second jaw is vertically displaced relative to the first jaw.

6. The trailer hitch as in claim 1 and further including a return spring disposed between the top surface of the second jaw and a bottom surface of the top plate of the head body.

7. The trailer hitch as in claim 1 wherein the means for elevating the second jaw comprises a cam surface disposed on the support frame and a release cam follower rotatable about the pivot pin associated with the second jaw and adapted to cooperate with the cam surface such that rotation of the release cam follower elevates the second jaw above the level of the first jaw.

8. The trailer hitch in claim 7 and further including a hand lever affixed to the release cam follower to facilitate rotation of the release cam follower.

9. A trailer hitch for engaging a kingpin of a trailer, the kingpin extending generally vertically, the trailer hitch comprising:
    a support frame;
    a first jaw supported by the support frame at a first jaw height; and
    a second jaw supported by the support frame so as to be positionable at the first jaw height in a mating position relative to the first jaw, the first jaw and the second jaw when disposed at the first jaw height defining a receiving opening for engagingly receiving the kingpin of the trailer, the first jaw and the second jaw contacting each other when both disposed at the first jaw height to cooperatingly prevent release of the engaged kingpin, the second jaw being vertically displaceable relative to the first jaw height to a release position, wherein, when the second jaw is vertically displaced to the release position, at least one of the first and second jaws are rotatable about a generally vertical axis thereby permitting engagement and release of the kingpin.

10. The trailer hitch of claim 9, further comprising a linkage for vertically displacing the second jaw between the first jaw height and the release position.

11. The trailer hitch of claim 9, wherein the first jaw and the second jaw, when both disposed at the first jaw height to cooperatingly prevent release of the engaged kingpin, encircle the kingpin.

12. The trailer hitch of claim 9, further comprising a spring biasing the second jaw to the first jaw height.

13. The trailer hitch of claim 9, wherein the first jaw and the second jaw rotate about pivot pins, wherein the vertical axes defined by the pivot pins are positioned forward of the receiving opening, such that when the second jaw is vertically displaced to the release position, both the first jaw and the second jaw can rotate about their respective pivot pins to open the receiving opening at its rearwardly directed side while overlapping forward of the receiving opening.

14. The trailer hitch of claim 9, wherein the support frame comprises a base and a slide permitting movement of the receiving opening forward and rearward relative to the base.

15. The trailer hitch of claim 9, wherein the support frame comprises top plate with a U-shaped cut out which permits access of the kingpin to the receiving opening.

16. A trailer hitch for engaging a kingpin of a trailer, the trailer hitch comprising:
a support frame;
a first plate supported by the support frame in a first plate plane;
a second plate supported by the support frame, the second plate being movable into and out of the first plate plane, wherein the first plate and the second plate in the first plate plane jointly define a kingpin receiving opening which encircles and secures an engaged kingpin, and wherein, when the second plate is moved out of the first plate plane, the kingpin can be introduced to or removed from the receiving opening.

17. The trailer hitch of claim 16, wherein the kingpin receiving opening is a circle defined by a 180° semicircular cut-out on the first plate and a 180° semicircular cut-out on the second plate.

18. The trailer hitch of claim 16, wherein the kingpin receiving opening has a central axis, wherein the first plate contacts the second plate at a first contact interface which extends radially outward from the central axis, and wherein the first plate contacts the second plate at a second contact interface which extends radially outward from the central axis on an opposing side of the central axis to the first contact interface.

19. The trailer hitch of claim 18, wherein the first contact interface, the central axis and the second contact interface all extend in a single vertically oriented plane.

20. The trailer hitch of claim 16, further comprising a linkage for moving the second plate into and out of the first plate plane.

* * * * *